United States Patent [19]
Kimmel et al.

[11] Patent Number: 6,050,220
[45] Date of Patent: Apr. 18, 2000

[54] POULTRY FEEDER WITH ADJUSTABLE FEED LEVEL CONTROL

[75] Inventors: James T. Kimmel, Celina; Don G. Grover, West Milton, both of Ohio

[73] Assignee: Pax Steel Products, Inc., Coldwater, Ohio

[21] Appl. No.: 09/082,902

[22] Filed: May 21, 1998

Related U.S. Application Data

[60] Provisional application No. 60/047,506, May 23, 1997.

[51] Int. Cl.[7] .................................................. A01K 39/01
[52] U.S. Cl. ........................................... 119/53; 119/57.4
[58] Field of Search ........................... 119/53, 57.4, 57.7, 119/57.5, 57

[56] References Cited

U.S. PATENT DOCUMENTS

| | | | |
|---|---|---|---|
| 3,490,419 | 1/1970 | Van Huis . | |
| 4,348,988 | 9/1982 | Lawson | 119/53 |
| 4,476,811 | 10/1984 | Swartzendruber | 119/57.4 |
| 4,552,095 | 11/1985 | Segalla | 119/53 |
| 4,676,197 | 6/1987 | Hoover | 119/57.4 |
| 5,007,380 | 4/1991 | Badia et al. . | |
| 5,092,274 | 3/1992 | Cole et al. | 119/57.4 |
| 5,101,766 | 4/1992 | Runion | 119/53 |
| 5,113,797 | 5/1992 | Daele | 119/53 |
| 5,406,907 | 4/1995 | Hart . | |
| 5,462,017 | 10/1995 | Pollock et al. . | |
| 5,497,730 | 3/1996 | Daele et al. | 119/53 |
| 5,724,912 | 3/1998 | Cull | 119/57.2 |
| 5,762,021 | 6/1998 | Horwood et al. | 119/57.4 |
| 5,765,503 | 6/1998 | Daele | 119/52.4 |
| 5,794,562 | 8/1998 | Hart | 119/52.4 |
| 5,875,733 | 3/1999 | Chen | 119/57.4 |
| 5,884,581 | 3/1999 | Vandaele | 119/52.4 |

*Primary Examiner*—Peter M. Poon
*Assistant Examiner*—Yvonne Abbott
*Attorney, Agent, or Firm*—Jacox, Meckstroth & Jenkins

[57] ABSTRACT

A poultry feeder includes a drop tube which attaches to a horizontal feed distribution line, and a feed pan and grill assembly is mounted on the drop tube for vertical sliding movement. An annular flow control member is supported above the feed pan for relative vertical movement by an actuator sleeve and a set of racks and pinions to produce downward movement of the flow control member in response to upward movement of the drop tube with the feed distribution line. The flow control member may also be adjusted manually relative to the drop tube for selecting the maximum level of feed in the feed pan.

16 Claims, 5 Drawing Sheets

POULTRY FEEDER WITH ADJUSTABLE FEED LEVEL CONTROL

RELATED APPLICATION

This application claims the benefit of provisional patent application No. 60/047,506, filed May 23, 1997.

BACKGROUND OF THE INVENTION

This invention relates to poultry feeders with adjustable feed levels and of the general type disclosed in U.S. Pat. Nos. 3,490,419, 5,007,380, 5,406,907, and 5,462,017, and which are used to raise poultry from a young age to a full grown age. During the growth of the birds, different feed levels are necessary to obtain efficient growth of the birds. When a new flock of birds is delivered into a poultry barn or facility, the birds are only three to five inches tall. At this young age, the feeders are adjusted so that the feed level within each feeder can be easily seen by the young birds. As the birds grow, the feed level within the feeder is adjusted and/or the feeder is elevated to accommodate the taller birds.

SUMMARY OF THE INVENTION

The present invention is directed to an improved poultry feeder which is constructed so that the lowest position of the feeder results in producing the highest feed level within the feeder so that the young birds can see the feed and are drawn to the feed within the feeder. The highest feed level within the feeder also permits young birds to crawl into and out of the feeder. As the birds grow, the horizontal feed delivery line or tube is raised, which results in lowering the feed level within each feeder. When each feeder is lifted from the floor by means of the delivery tube, the feed level within the feeder remains at its lowest level where the feed is accessible by the full grown birds. This lowest feed level is usually maintained throughout the remainder of the growth cycle for the birds.

Other features and advantages of the invention will be apparent from the following description, the accompanying drawings and the appended claims.

DESCRIPTION OF THE PREFERRED EMBODIMENT

Figure 1:
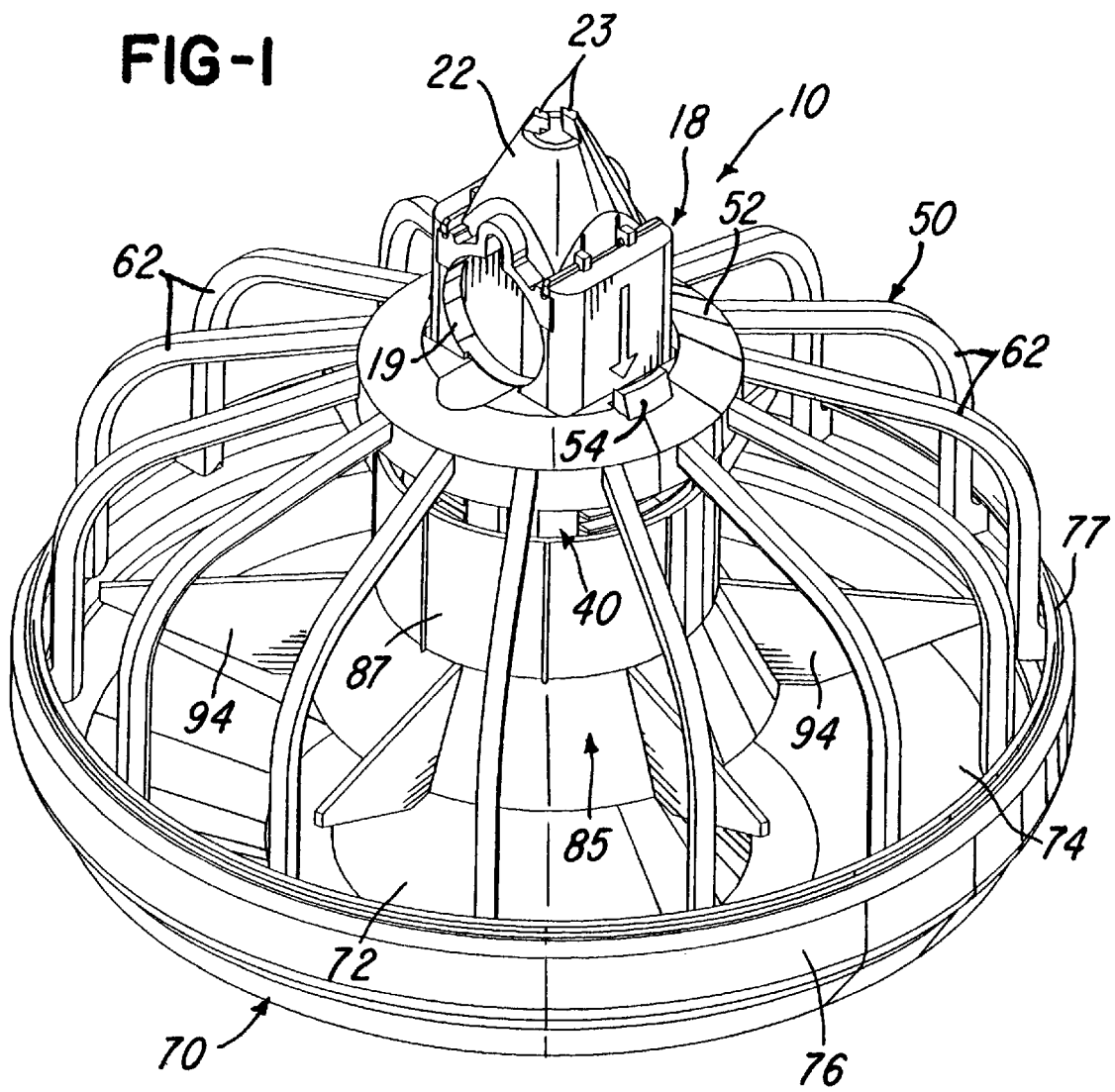
FIG. 1 is a perspective view of a poultry feeder constructed in accordance with the invention and showing the feeder in a position for the highest feed level within the feeder.
Figure 2:
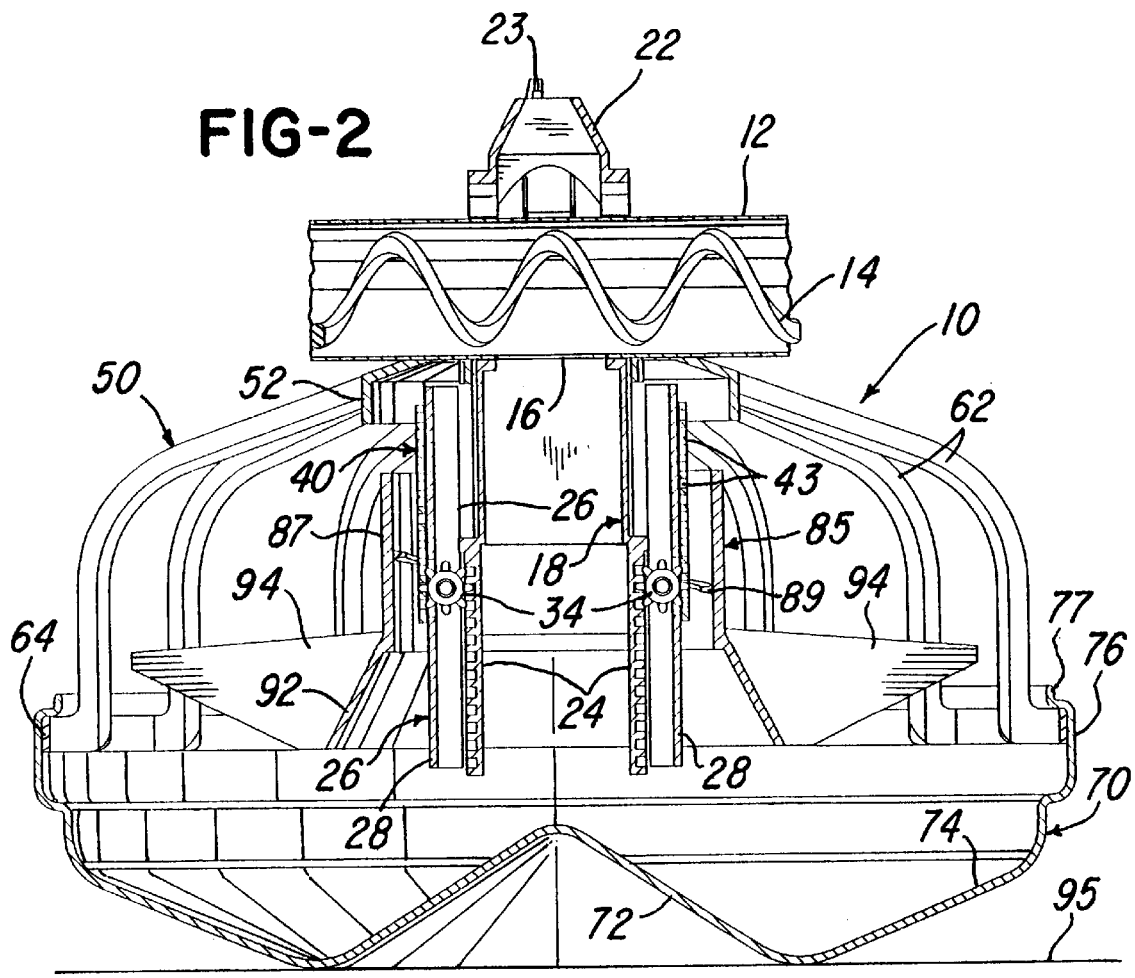
FIG. 2 is a section of the poultry shown in FIG. 1 while the feeder is resting on the floor.

Referring to FIGS. 1 and 2, a poultry feeder 10 receives granular feed through a horizontal feed supply or delivery tube 12 which commonly extends generally the full length of a poultry feeder house. The tube 12 receives a rotary auger 14 which is intermittently driven or rotated to move the feed axially within the tube 12 so that the feed exits or drops downwardly through a bottom hole 16 associated with each feeder 10. Preferably, the poultry feeder 10 is constructed entirely of injection molded plastic parts or components and includes a vertical drop tube 18 having generally a square cross-sectional configuration (FIG. 5) and defining an arcuate recess 19 (FIG. 4) for receiving the delivery tube 12. A cap member 22 slides laterally onto the upper portion of the drop tube 18 to secure the drop tube to the delivery tube. A pair of ears 23 at the top of the cap member 22 are for receiving and locating an electrically charged wire, as shown in above mentioned U.S. Pat. No. 5,007,380, for preventing the birds from roosting on the feed tube 12.

A set of linear gear teeth or racks 24 are integrally molded as part of the drop tube 18 on opposite side walls, and a tubular sleeve 26 receives the drop tube 18 and has opposite vertical channel portions 28 opposing the racks 24. Cross slots 31 and 32 are formed within each channel portion 28 and receive a small pinion or spur gear 34 mounted on a shaft 36. The slot 32 rotatably supports the shaft 36 and positions the gear 34 so that it engages the corresponding rack 24. A tubular feed gate 40 is also molded of a plastics material and includes opposing channel portions 42 (FIG. 5A) each of which has vertically spaced horizontal slots 43 so that the channel portions 42 form another pair of vertical racks which also receive the teeth on the pinions or gears 34.

A molded plastic grill 50 (FIG. 5) includes an upper annular hub portion 52 which is connected to the upper end portion of the tubular sleeve 26 by a pair of spring hooks 54 molded as integral parts of the sleeve 26. The hub portion 52 has a downwardly projecting wall 57 around the drop tube 18 and which engages the top end of the sleeve 26 to lock the grill 50 to the sleeve 26. The grill 50 has circumferentially and angularly spaced ribs 62 (FIG. 5) which are integrally molded with the annular hub 52 and with a bottom connecting ring 64. The ring 64 is split at one location to provide for slightly collapsing the ring 64.

A molded plastic feed pan 70 (FIG. 1) includes an upwardly projecting center conical portion 72 surrounded by a frusto-conical portion 74. The portion 74 is surrounded by a channel-shaped rim portion 76 having an inwardly projecting upper annular lip 77. The feed pan 70 is attached to the grill 50 by slightly collapsing the ring portion 64 of the grill 50 and expanding it into the channel portion 76 of the feed pan 70.

An annular feed level control member 85 (FIG. 5) includes a tubular sleeve portion 87 which surrounds the feed gate 40. The sleeve portion 87 is adjustably connected to the feed gate by means of segmented threads 89 within the tubular sleeve portion 87 and external thread segments 90 on the feed gate 40. A frusto-conical skirt portion 92 is molded as an integral part of the control member 85 at the bottom of the tubular sleeve portion 87, and a series of peripherally spaced tapered ribs or fins 94 project outwardly from the skirt portion 92.

In operation of the poultry feeder 10, the horizontal delivery tube 12 is commonly supported for adjustable vertical movement by means of longitudinally spaced cables (not shown) extending from winches. When the delivery tube 12 is in its lowest position (FIGS. 1 & 2), the bottom pan 70 of the feeder 10 rests upon the floor 95, and the delivery tube engages or seats on the hub portion 52 of the grill 50. In this lowest position shown in FIG. 1, the feed gate 40 and feed control member 85 are in their highest adjustable positions to provide for maximum feed at the highest flooding level within the feed pan 70 at the bottom of the skirt portion 92. In this position of the member 85, the young birds can see the feed within the feed pan 70 and will climb into the feeder between the ribs 62.

Figure 3:
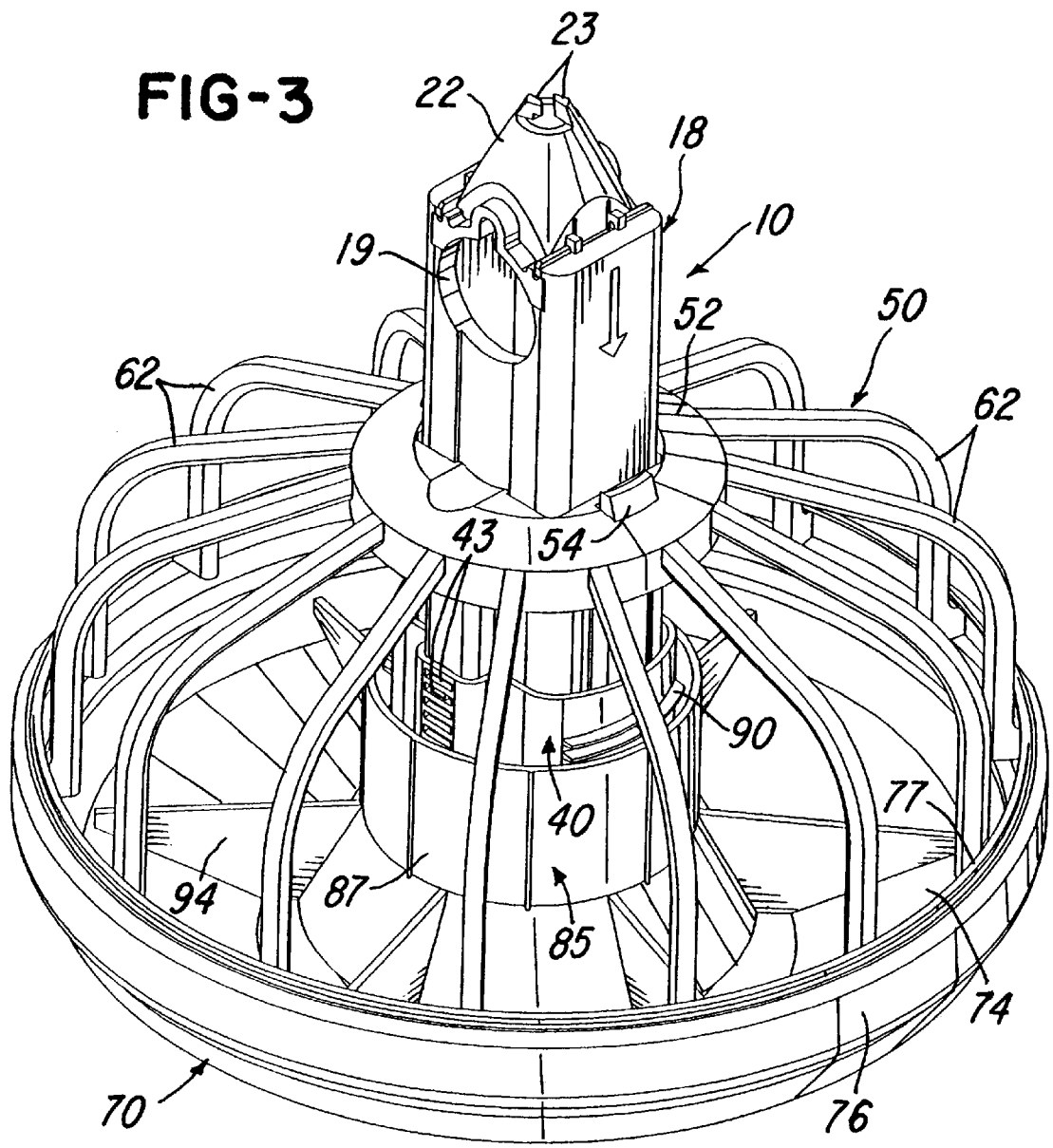
FIG. 3 is a perspective view similar to FIG. 1 and showing the feeder in a position with the lowest feed level within the feeder.
Figure 4:
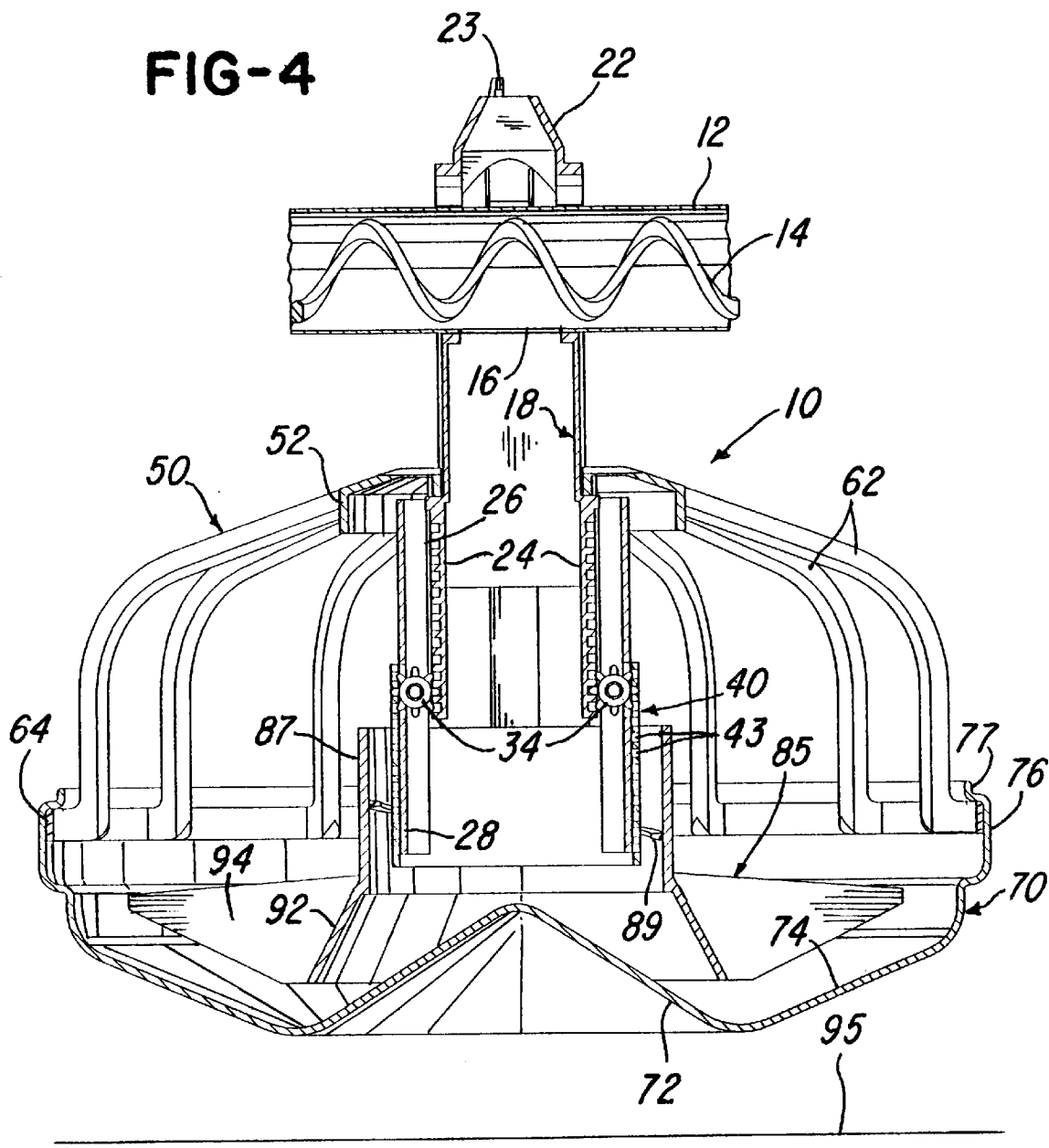
FIG. 4 is a section similar to FIG. 2 of the feeder shown in FIG. 3.
Figure 5:
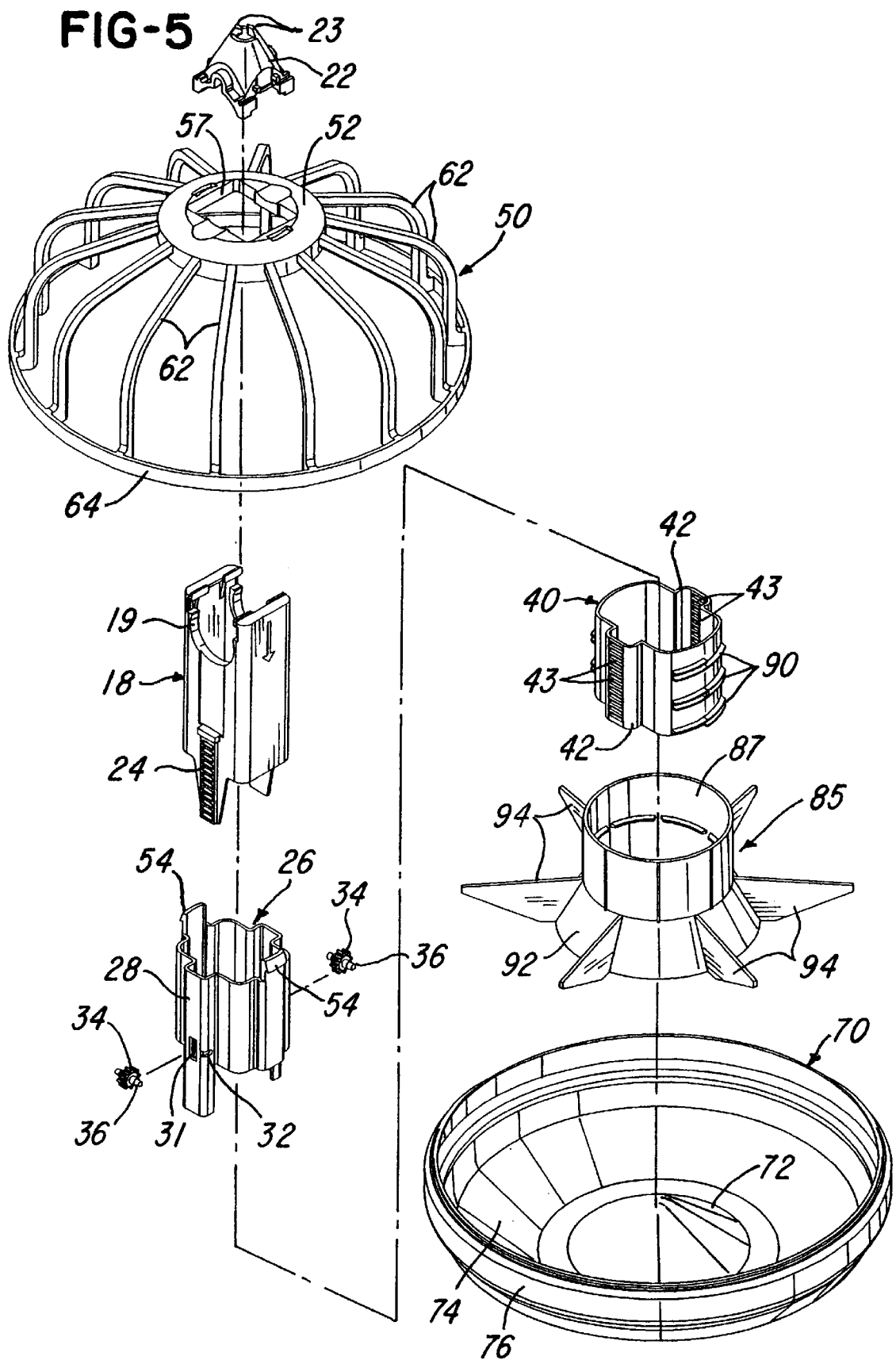
FIG. 5 is an exploded perspective view of the poultry feeder of FIGS. 1–4 and showing the components in perspective.

As the birds grow, the delivery tube 12 and drop tube 18 are progressively raised while the pan 70 remains on the floor 95. As apparent from FIGS. 3 and 4, as the drop tube 18 moves upwardly within the hub 52 of the grill 50, the rack and pinion actuating or adjustment mechanism (FIGS. 2 & 4) shifts the feed gate 40 and feed level control member 85 downwardly, eventually to the lowest position of the feed gate 40, as shown in FIGS. 3 & 4. In this position, the feed level, as determined by the bottom edge of the skirt portion 92, is at its lowest position within the feed pan 70. As also apparent from FIG. 4, further elevation of the delivery tube 12 and drop tube 18 raises the feed pan 70 above the floor 95 in order to position the pan lip 77 according to the size and height of the birds. As mentioned above, the feed level control member 85 may be manually positioned or rotatably adjusted on the feed gate 40 in order to manually adjust the highest feed level and the lowest feed level relative to the feed pan 70.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. A poultry feeder adapted to be supported by a horizontally extending feed distribution tube, comprising a generally vertical drop tube adapted to be supported by and receive feed from the distribution tube, a feed pan disposed under said drop tube for receiving the feed and supported by said drop tube for vertical movement relative to said drop tube, a grill member surrounding said drop tube and connected to said feed pan, a vertically moveable flow control member disposed within said feed pan for establishing an adjustable level of feed within said pan and moveable vertically relative to said pan and said drop tube, a support actuator for said flow control member and connected to said drop tube, and said support actuator being operable to move said flow control member downwardly relative to said pan automatically in response to upward movement of said drop tube relative to said pan.

2. A poultry feeder as defined in claim 1 wherein said support actuator for said control member comprises a rack and pinion mechanism connecting said flow control member to said drop tube.

3. A poultry feeder as defined in claim 1 wherein said drop tube comprises at least one generally vertical first gear rack, a pinion supported in engagement with said first gear rack, and a second generally vertical gear rack engaging said pinion and connected to said flow control member.

4. A poultry feeder as defined in claim 3 and including a tubular sleeve surrounding said drop tube and having means supporting said pinion for rotation.

5. A poultry feeder as defined in claim 4 wherein said grill member includes an annular hub surrounding said drop tube, and means securing said tubular sleeve to said annular hub of said grill member.

6. A poultry feeder as defined in claim 4 and including a tubular adjustment member surrounding said sleeve and including said second gear rack engaging said pinion, said flow control member including an annular portion surrounding said tubular adjustment member, and vertical adjustment means connecting said annular portion of said flow control member to said tubular adjustment member.

7. A poultry feeder as defined in claim 1 wherein said drop tube has opposite sides including a pair of generally vertical first gear racks, a tubular sleeve surrounding said drop tube and supporting a pair of pinions in engagement with the corresponding said first gear racks, and a second pair of generally vertical gear racks engaging said pinions and connected to said flow control member.

8. A poultry feeder as defined in claim 1 wherein said drop tube includes an upper portion defining a recess adapted to receive the feed distribution tube, a cap member releasably secured to said upper portion of said drop tube for retaining said drop tube on the feed distribution tube, and said drop tube has a lower portion having a pair of spaced vertical gear racks.

9. A poultry feeder adapted to be supported by a horizontally extending feed distribution tube, comprising a generally vertical drop tube adapted to be supported by and receive feed from the distribution tube, a feed pan disposed under said drop tube for receiving the feed from said drop tube, a grill member mounted on said feed pan and including an annular hub portion surrounding said drop tube and moveable vertically on said drop tube, a vertically moveable flow control member disposed within said feed pan for establishing an adjustable level of feed within said pan and moveable vertically relative to said pan and said drop tube, an actuator mechanism connecting said flow control member to said drop tube, and said actuator mechanism being operable to move said flow control member automatically downwardly relative to said pan in response to upward movement of said drop tube relative to said pan and said grill member.

10. A poultry feeder as defined in claim 9 wherein said actuator mechanism comprises a rack and pinion mechanism connecting said flow control member to said drop tube.

11. A poultry feeder as defined in claim 9 wherein said drop tube comprises a plurality of generally vertical first gear racks, a plurality of pinions supported in engagement with said first gear racks, and a plurality of second generally vertical gear racks engaging said pinions and connected to said flow control member.

12. A poultry feeder as defined in claim 11 and including a tubular sleeve surrounding said drop tube and having walls supporting each of said pinions for rotation.

13. A poultry feeder as defined in claim 12 wherein said tubular sleeve is connected to said annular hub of said grill member for vertical movement therewith.

14. A poultry feeder as defined in claim 12 and including a tubular adjustment member surrounding said sleeve and including said second gear racks engaging said pinions, said flow control member including an annular portion surrounding said tubular adjustment member, and a set of vertically spaced adjustment thread segments connecting said annular portion of said flow control member to said tubular adjustment member.

15. A poultry feeder as defined in claim 9 wherein said drop tube is generally square in cross-section and has opposite sides including a pair of generally vertical first gear racks, a tubular sleeve surrounding said drop tube and supporting a pair of pinions in engagement with the corresponding said first gear racks, and a second pair of generally vertical gear racks engaging said pinions and connected to said flow control member.

16. A poultry feeder as defined in claim 9 wherein said drop tube includes an upper portion defining a recess adapted to receive the feed distribution tube, a cap member releasably secured to said upper portion of said drop tube for retaining said drop tube on the feed distribution tube, and said drop tube has a lower portion having a pair of spaced vertical gear racks.

\* \* \* \* \*